(12) United States Patent
Rojer

(10) Patent No.: US 7,698,633 B2
(45) Date of Patent: Apr. 13, 2010

(54) MARKUP METALANGUAGE

(76) Inventor: Alan S. Rojer, 423 Walton Rd., Maplewood, NJ (US) 07040-1119

( * ) Notice: Subject to any disclaimer, the term of this patent is extended or adjusted under 35 U.S.C. 154(b) by 1176 days.

(21) Appl. No.: 11/286,913

(22) Filed: Nov. 23, 2005

(65) Prior Publication Data

US 2006/0112328 A1    May 25, 2006

Related U.S. Application Data

(60) Provisional application No. 60/631,291, filed on Nov. 24, 2004.

(51) Int. Cl.
*G06F 17/00* (2006.01)
(52) U.S. Cl. ........................ 715/236; 707/101
(58) Field of Classification Search ................ 715/236, 715/234, 237, 239; 707/1, 101, 102
See application file for complete search history.

(56) References Cited

U.S. PATENT DOCUMENTS

| | | | |
|---|---|---|---|
| 6,490,591 B1 | 12/2002 | Denbar et al. | |
| 6,785,882 B1 * | 8/2004 | Goiffon et al. | ............... 717/120 |
| 6,904,562 B1 | 6/2005 | Hind et al. | |
| 6,938,204 B1 | 8/2005 | Hind et al. | |
| 7,043,687 B2 * | 5/2006 | Knauss et al. | ................ 715/236 |
| 7,134,075 B2 | 11/2006 | Hind et al. | |
| 7,165,063 B2 * | 1/2007 | Beyer et al. | ...................... 707/3 |
| 7,296,226 B2 * | 11/2007 | Junkermann | ................. 715/249 |
| 7,478,100 B2 * | 1/2009 | Murthy et al. | ............... 707/100 |
| 7,493,305 B2 * | 2/2009 | Thusoo et al. | .................. 707/2 |
| 2003/0033314 A1 | 2/2003 | Muschenborn | |
| 2003/0046317 A1 | 3/2003 | Cseri et al. | |
| 2003/0126136 A1 * | 7/2003 | Omoigui | ...................... 707/10 |
| 2003/0212664 A1 * | 11/2003 | Breining et al. | ................. 707/3 |
| 2004/0010752 A1 * | 1/2004 | Chan et al. | .................. 715/513 |
| 2004/0167864 A1 * | 8/2004 | Wang et al. | ..................... 707/1 |
| 2005/0278616 A1 | 12/2005 | Eller | |

OTHER PUBLICATIONS

Hoschek, Wolfgang, et al, "A Unified Peer-to-Peer Database Framework for XQueries Over Dynamic Distributed Content and its Application for Scalable Service Discovery", Technical University of Vienna, 2003, pp. 1-166.*

Chan, C.Y., et al, "Efficient Filtering of XML Documents With XPath Expressions", The VLDB Journal—The International Journal on Very Large Databases, vol. 11, Issue 4, Dec. 2002, pp. 354-379.*

(Continued)

*Primary Examiner*—Laurie Ries

(57) ABSTRACT

A computer-implemented method for processing markup includes the steps of detecting textual content, detecting a markup element, detecting a predicate segment, and detecting a body. The markup element includes an open character, a textual name, an optional predicate segment, an optional body, and a close character. The predicate segment includes one or more predicates, separated by a predicate separator character. Each predicate includes a textual relation and optional textual complements separated by a complements separator character. The body includes a body separator character and a possibly empty sequence of instances of textual content and nested markup elements. Computer-readable markup data includes a sequence of textual content and markup elements. A computer-implemented driver configured to process markup and to generate object-oriented requests to a model object and a plurality of element objects includes a lexical analyzer, a syntax analyzer, and a parse responder.

2 Claims, 15 Drawing Sheets

OTHER PUBLICATIONS

ECMAScript Language Specification, 3rd Ed. Dec. 1999, Standard ECMA-262, pp. 40-43.

Edd Dumbill, XML Watch: Exploring alternative syntaxes for XML, Oct. 1, 2002; http://www.ibm.com/developerworks/xml/library/x-syntax.html; downloaded Mar. 13, 2008.

Langdale Consutlants, Simple Outline XML: SOX; 2001-2002 http://www.langdale.com.au/S0X/; downloaded Feb. 2, 2005.

David Mertz, XML Matters: Intro to PYX; Feb 1, 2002, http://www.ibm.com/developerworks/xml/library/x-matters17.html; downloaded Mar. 13, 2008.

Scott Sweeney, What is SLiP? Apr. 3, 2002; http://slip.sourceforge.net/aboutSLiP.htm; downloaded Mar. 13, 2008.

Oren Ben-Kiki et al. YAML Ain't Markup Language (YAML(TM)) 1.0, Working Draft Jan. 29, 2004, http://yaml.org/spec/history/2004-01-29/2004-01-29.html; downloaded Mar. 18, 2008.

* cited by examiner

FIG. 1

```
{rss|
  {channel title 'One Channel'; link 'http://one.demo/channel-1/'|
    {description|Our first RSS Channel}
    {item title 'Our First Item'; link 'http://one.demo/item-2005-11-001/'|
      {description|The first RSS item we ever published!  Don't miss this!}
    }
    {item title 'Our Second Item'; link 'http://one.demo/item-2005-11-002/'|
      {description|Our second RSS item.  Not as cool as the first one.}
    }
  }
}
```

FIG. 2

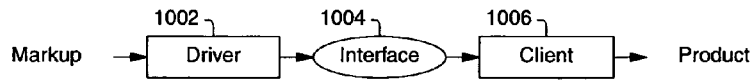

Markup → Driver (1002) → Interface (1004) → Client (1006) → Product

FIG. 3

```
// Interface1004...
class ClientModel1022 {
  ClientElement1024* construct_element1028(Text1026);
  bool accept_element1030(ClientElement1024*);
  bool accept_text1032(Text1026);
};
class ClientElement1024 {
  bool accept_attribute1034(Text1026, Text1026, ClientModel1022&);
  bool configure1036(ClientModel1022 &);
  bool accept_element1038(ClientElement1024*, ClientModel1022&);
  bool accept_text1040(Text1026, ClientModel1022&);
  bool commit1042(ClientModel1022&);
};
```

FIG. 5

```
class pmlElement^1044 {
};

class pmlLeaf^1046: public pmlElement^1044 {
private:
   Text _text^1052;
};

class pmlPredicate^1050: public pmlElement^1044 {
private:
   Text _relation^1054;
   TextSequence _complements^1056;
};

class pmlNode^1048: public pmlElement^1044 {
private:
   // members...
   Text _name^1058;
};
```

FIG. 6

1000 Lexical Analyzer[1008] INITIAL[1060] Matches

| Match | Regexp | Terminals[1010] | Notifications[1014] | Next |
|---|---|---|---|---|
| 1068 | # *$ | | | |
| 1070 | [\n] | WHITE[1072] | body_newline[1074] | |
| 1076 | [ \t]+ | WHITE[1072] | body_white[1078] | |
| 1080 | "{" | OPEN[1082] | | HEAD[1062] |
| 1084 | "}" | CLOSE[1086] | | |
| 1088 | "\\{" | BLACK[1090] | escape_open[1092] | |
| 1094 | "\\}" | BLACK[1090] | escape_close[1096] | |
| 1098 | . | BLACK[1090] | black[1100] | |

FIG. 7

1000 Lexical Analyzer[1008] HEAD[1062] Matches

| Match | Regexp | Terminal | Notifications[1014] | Next |
|---|---|---|---|---|
| 1102 | "\|" | BAR[1104] | | INITIAL[1060] |
| 1106 | "," | COMMA[1108] | | |
| 1110 | ";" | SEMICOLON[1112] | | |
| 1114 | [ \t]+ | | | |
| 1116 | \n | | head_newline[1118] | |
| 1120 | "\"" | | quote_open[1122] | DOUBLE_QUOTE[1064] |
| 1124 | "'" | | quote_open[1122] | SINGLE_QUOTE[1066] |
| 1126 | [-a-zA-Z0-9_.]+ | NAME[1128] | name[1130] | |
| 1132 | "}" | CLOSE[1086] | | INITIAL[1060] |
| 1134 | . | | bad_character[1136] | |

*FIG. 8*

1000 Lexical Analyzer[1008] DOUBLE_QUOTE[1064] Matches

| Match | Regexp | Terminal | Notifications[1014] | Next |
|---|---|---|---|---|
| 1138 | "\"" | QUOTE[1140] | quote_close[1142] | HEAD[1062] |
| 1144 | "\\\"" | | escape_doublequote[1146] | |
| 1148 | \n | | quote_newline[1150] | |
| 1152 | . | | quote_accumulate[1154] | |

*FIG. 9*

1000 Lexical Analyzer[1008] SINGLE_QUOTE[1066] Matches

| Match | Regexp | Terminal | Notifications[1014] | Next |
|---|---|---|---|---|
| 1156 | "'" | QUOTE[1140] | quote_close[1142] | HEAD[1062] |
| 1158 | "\\'" | | escape_singlequote[1160] | |
| 1162 | \n | | quote_newline[1150] | |
| 1164 | . | | quote_accumulate[1154] | |

FIG. 10

1000 Syntax Analyzer[1012]

| Rule | Production | | | Notifications[1018] |
|---|---|---|---|---|
| 1168 | start[1170] | : | | |
| 1172 | start[1170] | : | start[1170] leaf[1174] | accept_leaf[1176] |
| 1178 | start[1170] | : | start[1170] node[1180] | accept_node[1182] |
| 1184 | node[1180] | : | head[1186] CLOSE[1086] | configure_commit_node[1188] |
| 1190 | node[1180] | : | body[1192] CLOSE[1086] | commit_node[1194] |
| 1196 | body[1192] | : | head[1186] BAR[1104] | configure_node[1198] |
| 1200 | body[1192] | : | body[1192] leaf[1174] | node_accept_leaf[1202] |
| 1204 | body[1192] | : | body[1192] node[1180] | node_accept_node[1206] |
| 1208 | head[1186] | : | tag[1210] | |
| 1212 | head[1186] | : | tag[1210] pred[1214] | node_accept_first_predicate[1216] |
| 1218 | head[1186] | : | head[1186] SEMICOLON[1112] pred[1214] | node_accept_predicate[1220] |
| 1222 | tag[1210] | : | OPEN[1082] NAME[1128] | construct_node[1224] |
| 1226 | pred[1214] | : | relation[1228] | predicate[1230] |
| 1232 | pred[1214] | : | relation[1228] complement[1234] | predicate_complement[1236] |
| 1238 | pred[1214] | : | pred[1214] COMMA[1108] complement[1234] | predicate_plural_complement[1240] |
| 1242 | relation[1228] | : | NAME[1128] | |
| 1244 | complement[1234] | : | NAME[1128] | |
| 1246 | complement[1234] | : | quote[1248] | |
| 1250 | quote[1248] | : | QUOTE[1140] | |
| 1252 | quote[1248] | : | quote[1248] QUOTE[1140] | accumulate[1254] |
| 1256 | leaf[1174] | : | black[1258] | |
| 1260 | leaf[1174] | : | white[1262] | |
| 1264 | white[1262] | : | WHITE[1072] | |
| 1266 | white[1262] | : | white[1262] WHITE[1072] | accumulate[1254] |
| 1268 | black[1258] | : | BLACK[1090] | |
| 1270 | black[1258] | : | black[1258] BLACK[1090] | accumulate[1254] |

FIG. 11

```
class ParseResponder1166 {
public:
   bool parse1274(FILE *);
private:
   Text _accumulator1276;
public:
   // lexer match notifications...
   bool body_white1278(const char *yyleaf, class pmlLeaf1046* &);
   bool body_newline1280(const char *yyleaf, class pmlLeaf1046* &);
   bool escape_open1282(const char *yyleaf, class pmlLeaf1046* &);
   bool escape_close1284(const char *yyleaf, class pmlLeaf1046* &);
   bool name1286(const char *yyleaf, class pmlLeaf1046* &);
   bool black1288(const char *yyleaf, class pmlLeaf1046* &);
   bool head_newline1290(const char *yyleaf);
   bool quote_open1292(const char *yyleaf);
   bool bad_character1294(const char *yyleaf);
   bool quote_close1296(const char *yyleaf, class pmlLeaf1046* &);
   bool escape_doublequote1298(const char *yyleaf);
   bool quote_newline1300(const char *yyleaf);
   bool quote_accumulate1302(const char *yyleaf);
   bool escape_singlequote1304(const char *yyleaf);
   // parser rule notifications...
   bool accept_leaf1306(int &, int, pmlLeaf1046*);
   bool accept_node1310(int &, int, pmlNode1048*);
   bool configure_commit_node1314(pmlNode1048* &, pmlNode1048*, int);
   bool commit_node1320(pmlNode1048* &, pmlNode1048*, int);
   bool configure_node1322(pmlNode1048* &, pmlNode1048*, int);
   bool node_accept_leaf1324(pmlNode1048* &, pmlNode1048*, pmlLeaf1046*);
   bool node_accept_node1328(pmlNode1048* &, pmlNode1048*, pmlNode1048*);
   bool node_accept_first_predicate1332(pmlNode1048* &, pmlNode1048*,
      pmlPredicate1050*);
   bool node_accept_predicate1336(pmlNode1048* &, pmlNode1048*, int,
      pmlPredicate1050*);
   bool predicate1338(pmlPredicate1050* &, pmlLeaf1046*);
   bool predicate_complement1340(pmlPredicate1050* &, pmlLeaf1046*, pmlLeaf1046*);
   bool predicate_plural_complement1342(pmlPredicate1050* &, pmlPredicate1050*,
      int, pmlLeaf1046*);
   bool construct_node1344(pmlNode1048* &, int, pmlLeaf1046*);
   bool accumulate1348(pmlLeaf1046* &, pmlLeaf1046*, pmlLeaf1046*);
};
```

FIG. 12

```
// continued...
class ParseResponder¹¹⁶⁶ {
public:
   // abstract interface for use by ClientDriver¹²⁷²
   virtual bool request_model_construct_element¹³⁴⁶(pmlNode¹⁰⁴⁸*) = 0;
   virtual bool request_accept_root_element¹³¹²(pmlNode¹⁰⁴⁸*) = 0;
   virtual bool request_accept_root_text¹³⁰⁸(pmlLeaf¹⁰⁴⁶*) = 0;
   virtual bool request_accept_attribute¹³³⁴(pmlNode¹⁰⁴⁸*, Text, Text) = 0;
   virtual bool request_configure¹³¹⁶(pmlNode¹⁰⁴⁸*) = 0;
   virtual bool request_accept_element¹³³⁰(pmlNode¹⁰⁴⁸*, pmlNode¹⁰⁴⁸*) = 0;
   virtual bool request_accept_text¹³²⁶(pmlNode¹⁰⁴⁸*, pmlLeaf¹⁰⁴⁶*) = 0;
   virtual bool request_commit¹³¹⁸(pmlNode¹⁰⁴⁸*) = 0;
};
```

FIG. 13

```
template <class H¹³⁵⁰, class E¹³⁵²>
class ClientDriver¹²⁷² : public ParseResponder¹¹⁶⁶ {
private:
   H¹³⁵⁰& _model¹³⁵⁴;
   Stack<E¹³⁵²> _stack¹³⁵⁶;
public:
   pmlParser¹³⁵⁸(H& h) : _model¹³⁵⁴(h) {}
private:
   void push¹³⁶⁰(E¹³⁵²* e) {_stack¹³⁵⁶.push(e);}
   E¹³⁵²* pop¹³⁶⁴() {return _stack¹³⁵⁶.pop();}
   E¹³⁵²* top¹³⁶²() {return _stack¹³⁵⁶.top();}
   bool fail¹³⁶⁶(Text msg);
};
```

FIG. 14

```
// continued...
template <class H¹³⁵⁰, class E¹³⁵²>
class ClientDriver¹²⁷² : public ParseResponder¹¹⁶⁶ {
public:
  virtual bool request_model_construct_element¹³⁶⁸(pmlNode¹⁰⁴⁸ *n) {
    E¹³⁵²* e = _model¹³⁵⁴.construct_element¹⁰²⁸(n->name());
    if (!e) return fail("construct-element failed");
    push¹³⁶⁰(e);
    return 1;
  }
  virtual bool request_accept_root_element¹³⁷⁰(pmlNode¹⁰⁴⁸ *) {
    return _model¹³⁵⁴.accept_element¹⁰³⁰(pop¹³⁶⁴());
  }
  virtual bool request_accept_root_text¹³⁷²(pmlLeaf¹⁰⁴⁶ *t) {
    return _model¹³⁵⁴.accept_text¹⁰³²(t->text());
  }
  virtual bool request_accept_attribute¹³⁷⁴(pmlNode¹⁰⁴⁸ *, Text r, Text o) {
    return top¹³⁶²()->accept_attribute¹⁰³⁴(r, o, _model¹³⁵⁴);
  }
  virtual bool request_configure¹³⁷⁶(pmlNode¹⁰⁴⁸ *) {
    return top¹³⁶²()->configure¹⁰³⁶(_model¹³⁵⁴);
  }
  virtual bool request_accept_element¹³⁷⁸(pmlNode¹⁰⁴⁸ *, pmlNode¹⁰⁴⁸ *) {
    E¹³⁵² *e = pop();
    return top¹³⁶²()->accept_element¹⁰³⁸(e, _model¹³⁵⁴);
  }
  virtual bool request_accept_text¹³⁸⁰(pmlNode¹⁰⁴⁸*, pmlLeaf¹⁰⁴⁶ *t) {
    return top¹³⁶²()->accept_text¹⁰⁴⁰(t->text(), _model¹³⁵⁴);
  }
  virtual bool request_commit¹³⁸²(pmlNode¹⁰⁴⁸ *n) {
    return top¹³⁶²()->commit¹⁰⁴²(_model¹³⁵⁴);
  }
};
```

FIG. 16

```
struct DomAttribute¹³⁸⁶ {
  Text¹⁰²⁶ _key¹⁴⁰²;
  Text¹⁰²⁶ _value¹⁴⁰⁴;
  DomAttribute¹⁴⁰⁶(Text k, Text v) : _key¹⁴⁰²(k), _value¹⁴⁰⁴(v) {}
};
```

FIG. 17

```
struct DomElement¹³⁸⁸ {
  // provision of ClientElement¹⁰²⁴ interface...
  virtual bool accept_attribute¹⁴⁰⁸(Text¹⁰²⁶, Text¹⁰²⁶, DomModel¹³⁹⁰&) {
    return 0;
  }
  virtual bool configure¹⁴¹⁰(DomModel¹³⁹⁰&) {return 1;}
  virtual bool accept_element¹⁴¹²(DomElement¹³⁸⁸*, DomModel¹³⁹⁰) {
    return 0;
  }
  virtual bool accept_text¹⁴¹⁴(Text¹⁰²⁶, DomModel¹³⁹⁰&) {return 0;}
  virtual bool commit¹⁴¹⁸(DomModel¹³⁹⁰&) {return 1;}
  // safe downcast to specializations...
  virtual DomTextElement¹³⁹⁶* text_element¹⁴²⁰() {return 0;}
  virtual DomTagElement¹³⁹⁸* tag_element¹⁴²²() {return 0;}
  // dispatch to visitors...
  virtual bool dispatch_view¹⁴²⁴(DomViewer¹³⁹²&) const;
};
```

FIG. 18

```
struct DomViewer¹³⁹² {
  virtual ~DomViewer¹⁴²⁶() {}
  virtual bool view¹⁴²⁸(const DomModel¹³⁹⁰&);
  virtual bool view¹⁴³⁰(const DomElement¹³⁸⁸*) {return 1;}
  virtual bool view¹⁴³²(const DomTagElement¹³⁹⁸*) {return 1;}
  virtual bool view¹⁴³⁸(const DomTextElement¹³⁹⁶*) {return 1;}
};
```

FIG. 19

```
struct DomTextElement¹³⁹⁶ : public DomElement¹³⁸⁸ {
  Text¹⁰²⁶ _text¹⁴⁴⁰;
  DomTextElement¹⁴⁴²(Text¹⁰²⁶ t) : _text¹⁴⁴⁰(t) {}
  bool accept_attribute¹⁴⁴⁴(Text¹⁰²⁶, Text¹⁰²⁶, DomModel¹³⁹⁰&);
  bool configure¹⁴⁴⁶(DomModel¹³⁹⁰);
  bool accept_element¹⁴⁴⁸(DomElement¹³⁸⁸*, DomModel¹³⁹⁰&);
  bool accept_text¹⁴⁵⁰(Text¹⁰²⁶, DomModel¹³⁹⁰&);
  bool commit¹⁴⁵²(DomModel¹³⁹⁰&);
  DomTextElement¹³⁹⁶* text_element¹⁴⁵⁴() {return this;}
  bool dispatch_view¹⁴⁵⁶(DomViewer¹³⁹² &v) const {
    return v.view¹⁴³⁸(this);
  }
};
```

FIG. 20

```
struct DomTagElement¹³⁹⁸ : public DomElement¹³⁸⁸ {
  Text¹⁰²⁶ _name¹⁴⁵⁸;
  Sequence<DomAttribute¹³⁸⁶> _attributes¹⁴³⁶;
  Sequence<DomElement¹³⁸⁸> _children¹⁴³⁴;
  DomTagElement¹⁴⁶⁰(Text¹⁰²⁶);
  virtual ~DomTagElement¹⁴⁶²() { /* delete elements of _children¹⁴³⁴ }
  bool accept_attribute¹⁴⁶⁴(Text¹⁰²⁶, Text¹⁰²⁶, DomModel¹³⁹⁰&);
  bool configure¹⁴⁷⁰(DomModel¹³⁹⁰&);
  bool accept_element¹⁴⁷²(DomElement¹³⁸⁸*, DomModel¹³⁹⁰&);
  bool accept_text¹⁴⁷⁶(Text¹⁰²⁶, DomModel¹³⁹⁰&);
  bool commit¹⁴⁸⁰(DomModel¹³⁹⁰&);
  DomTagElement¹³⁹⁸* tag_element¹⁴⁸²() {return this;}
  bool dispatch_view¹⁴⁸⁴(DomViewer¹³⁹² &v) const {
    return v.view¹⁴³²(this);
  }
};
```

*FIG. 21*

```
struct DomModel1390 {
  DomTagElement1398 *_root1486;
  DomModel1488() : _root1486(0) {}
  ~DomModel1490() {delete _root1486;}
  DomElement1388* construct_element1492(Text1026 name1494) {;
    return new DomTagElement1398(name1494);
  }
  bool accept_element1496(DomElement1388* element1498);
  bool accept_text1500(Text1026) {return 1;}
};
```

FIG. 22

```
struct DomXmlWriter¹⁴⁰⁰ : public DomViewer¹³⁹² {
  TextSink _sink¹⁵⁰²;
  DomXmlWriter¹⁵⁰⁴(DomModel¹³⁹⁰, TextSink);
  void xml_encode¹⁵⁰⁶(Text¹⁰²⁶);
  bool view¹⁵⁰⁸(const DomTextElement¹³⁹⁶* e) {
    xml_encode¹⁵⁰⁶(e->_text¹⁴⁴⁰);
    return 1;
  }
  bool view¹⁵¹⁰(DomTagElement¹³⁹⁸);
};
```

FIG. 23

```
bool DomXmlWriter¹⁴⁰⁰::view¹⁵¹⁰(DomTagElement¹³⁹⁸ e)
{
  bool failed = 0;
  _sink¹⁵⁰² << Printf("<%s", e->_name¹⁴⁵⁸);
  foreach (DomAttribute¹³⁸⁶ a in e->_attributes¹⁴³⁶) {
    _sink¹⁵⁰² << " " << a->_key¹⁴⁰² << "=";
    _sink¹⁵⁰² << "'"; xml_encode¹⁵⁰⁶(a->_value¹⁴⁰⁴); _sink¹⁵⁰² << "'";
  }
  _sink¹⁵⁰² << ">";
  foreach (DomElement¹³⁸⁸ c in e->_children¹⁴³⁴ {
    if (!c->dispatch_view¹⁴²⁴(this)) failed = 1; break;
  }
  _sink¹⁵⁰² << Printf("</%s>", e->_name¹⁴⁵⁸;
  return !failed;
}
```

FIG. 24

```
int main¹⁵¹⁴()
{
  DomModel¹³⁹⁰ model¹⁵¹⁶;
  ClientDriver¹²⁷²<DomModel¹³⁹⁰, DomElement¹³⁸⁸> driver¹⁵¹⁸(model¹⁵¹⁶);
  if (!driver¹⁵¹⁸.parse¹²⁷⁴(stdin)) return -1;
  TextFileSink local¹⁵²⁰(stdout);
  DomXmlWriter¹⁴⁰⁰ writer¹⁵²²(model¹⁵¹⁶, local¹⁵²⁰);
  return 0;
}
```

FIG. 25

```
<rss>
  <channel title='One Channel' link='http://one.demo/channel-1/'>
    <description>Our first RSS Channel</description>
    <item title='Our First Item' link='http://one.demo/item-2005-11-001/'>
      <description>
        The first RSS item we ever published!  Don't miss this!
      </description>
    </item>
    <item title='Our Second Item' link='http://one.demo/item-2005-11-002/'>
      <description>
        Our second RSS item.  Not as cool as the first one.
      </description>
    </item>
  </channel>
</rss>
```

MARKUP METALANGUAGE

CROSS-REFERENCE TO RELATED APPLICATIONS

This application claims the benefit of PPA Ser. No. 60/631,291, filed Nov. 24, 2004 by the present inventor, the disclosure of which is incorporated herein by reference.

BACKGROUND AND OBJECTS OF THE INVENTION

This invention relates to specification and processing of markup.

The stored representations which are read and written by computer-implemented applications are often in the form of "markup." A particularly example of markup is the Extensible Markup Language (XML), which is in wide use. A useful reference for XML is the book "XML In a Nutshell, 3rd Edition", by Elliotte Rusty Harold and W. Scott Means, published by O'Reilly, 2004, ISBN 0-596-00764-7, which is incorporated herein by reference.

XML markup consists of hierarchically organized markup elements. A markup element typically consists of a start tag, an optional body, and an end tag. Where the body is absent, the start tag and end tag may be combined into a single tag. The start tag includes a textual name and optional attributes. The name describes the markup element. Each attribute includes a textual key and a textual value. Attributes may provide additional descriptive information about the markup element. The body of the markup element may contain both textual content and nested markup elements. The end tag concludes the markup element.

The hierarchical organization of markup is reflected in the nesting of markup elements. The body of a markup element may contain nested markup elements as well as textual content. The containing markup element is denoted the parent. The nested markup element is denoted the child. A markup element which lacks a parent is denoted a root. In XML, a well-formed document is required to contain exactly one root markup element.

XML is also an example of a metalanguage. A metalanguage is a foundation upon which languages may be built. XML specifies a syntax for markup, but it does not specify how markup should be processed or what interpretation should be attached to the markup elements. XML does not specify a set of valid element names or attributes (with a few minor exceptions). Nor does XML have much to say about relationships between markup elements. The only relationship between markup elements which is explicitly recognized in XML is hierarchy; markup elements may be nested within containing markup elements. Languages that are built upon XML may specify sets of valid names, interpretations for markup elements according to their names, relationships between markup elements, and even processing implications for markup elements, but such considerations are deliberately omitted from XML, which is limited to the syntax of markup.

A metalanguage for markup is of great practical value as it permits standardization of some aspects of processing markup. Applications which process XML may rely on a regular syntax and make use of numerous well-honed tools for application-specific processing of XML. Moreover, markup is readable and writable by humans as well as machines, which reduces the risk that data files will become unusable over time. Direct accessibility by humans also facilitates testing and debugging.

For these and other reasons, XML is very popular, but it does suffers from some shortcomings. The XML markup itself (as distinguished from the textual content) is somewhat redundant as names are duplicated in start and end tags. This redundancy is detrimental to human readers and writers. The implicit brackets that wrap a markup element consist of multiple characters, despite the availability of several distinct bracket character pairs in the ASCII character set. The semantics of attributes are murky; moreover there's no facility for plural values in an attribute. XML requires a single root markup element in a document, which is a reasonable requirement for certain applications but is unnecessarily restrictive in general; for example, this requirement precludes the validity of a document formed by concatentation of two valid documents. These shortcomings are alleviated by the use of a new metalanguage for specificationa and processing of markup.

Thus, it would be advantageous to alleviate some of the shortcomings which XML bears while maintaining a rough structural equivalence to XML, and preserving the benefits of a meta-language for markup. It would also be advantageous to facilitate markup processing by precisely specifying the processing of markup to requests in an object-oriented application programmer's interface (API).

SUMMARY

A computer-implemented method for processing markup includes the steps of detecting textual content, detecting a markup element, detecting a predicate segment, and detecting a body. The markup element includes an open character, a textual name, an optional predicate segment, an optional body, and a close character. The predicate segment includes one or more predicates, separated by a predicate separator character. Each predicate includes a textual relation and optional textual complements separated by a complements separator character. The body includes a body separator character and a possibly empty sequence of instances of textual content and nested markup elements. Computer-readable markup data includes a sequence of textual content and markup elements. A computer-implemented driver configured to process markup and to generate object-oriented requests to a model object and a plurality of element objects includes a lexical analyzer, a syntax analyzer, and a parse responder.

BRIEF DESCRIPTION OF DRAWINGS

FIG. 1 depicts a document using the markup language in accordance with an embodiment of the present invention.

FIG. 2 depicts an exemplary embodiment of a system for processing markup.

FIG. 3 depicts an exemplary embodiment of the interface for object-oriented processing of markup.

FIG. 5 depicts an exemplary embodiment of the classes element, leaf, predicate, and node for use in the syntax-directed translation of the markup formal language.

FIG. 6 depicts an exemplary embodiment of lexical matches for the initial state of the markup formal language.

FIG. 7 depicts an exemplary embodiment of lexical matches for the head state of the markup formal language.

FIG. 8 depicts an exemplary embodiment of lexical matches for the double-quote state of the markup formal language.

FIG. 9 depicts an exemplary embodiment of lexical matches for the state single-quote state of the markup formal language.

FIG. 10 depicts an exemplary embodiment of the formal syntax for the markup formal language.

FIG. 11 depicts an exemplary embodiment of the parse responder class, which responds to the syntax-directed notifications of the markup formal language.

FIG. 12 continues the depiction of an exemplary embodiment of the parse responder class.

FIG. 13 depicts an exemplary embodiment of the client driver template class, which dispatches interface requests to client objects.

FIG. 14 continues the depiction of an exemplary embodiment of the client driver template class.

FIG. 16 depicts an exemplary embodiment of a document-object attribute class.

FIG. 17 depicts an exemplary embodiment of a document-object element class.

FIG. 18 depicts an exemplary embodiment of a document-object viewer class.

FIG. 19 depicts an exemplary embodiment of a document-object text element.

FIG. 20 depicts an exemplary embodiment of a document-object tag element.

FIG. 21 depicts an exemplary embodiment of a document-object model class.

FIG. 22 depicts an exemplary embodiment of a document-object XML writer.

FIG. 23 depicts an exemplary embodiment of a view element member function in a document-object XML writer.

FIG. 24 depicts an exemplary embodiment of an xml-writer application which reads a markup document according to the exemplary embodiment of the invention and writes an XML document.

FIG. 25 depicts the XML document which is written by operation of the xml-writer application upon the previously depicted document using the markup language in accordance with an embodiment of the present invention.

DETAILED DESCRIPTION

1 Markup Metalanguage

Figure 4:
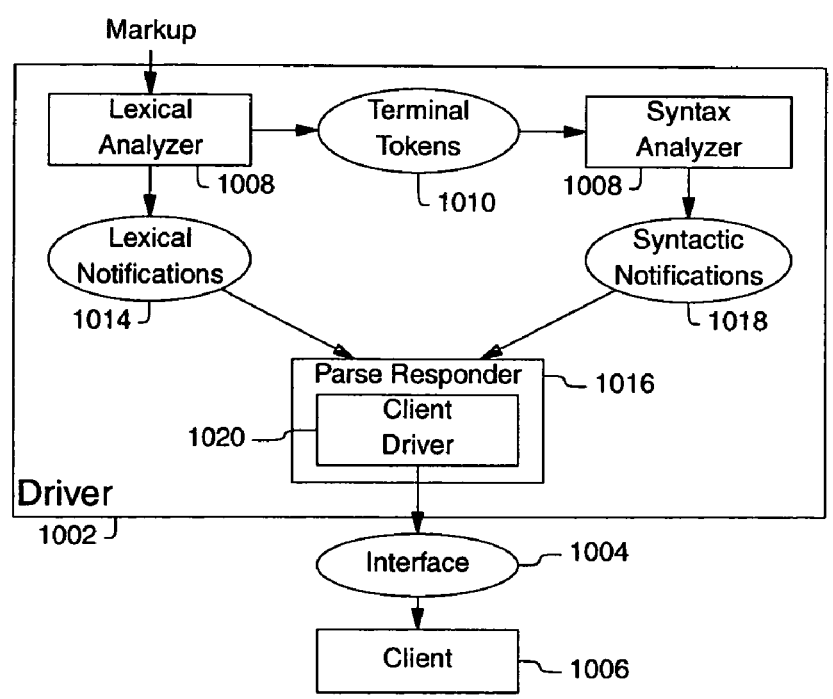
FIG. 4 depicts an exemplary embodiment of a driver for processing markup to interface requests to client objects.

FIG. 1 depicts a document represented using an examplary embodiment of the markup metalanguage. Compared to XML, the redundancy of the tag name in the start and end tags as well as the multiplicity of tag characters is alleviated by use of a curly bracket pair to represent an entire markup element. Along with the introduction of a body separator character, for which the vertical bar character serves, the tag overhead of a typical markup element with a non-empty body may be reduced by about half. For example, "<title>A Title</title>" becomes "{title|A Title}".

Attributes have been recast to predicates in declarative expressions. The verb phrase in a predicate generalizes the attribute key, which may be denoted a relation. The optional complement of the verb phrase, which may be singular, plural, or entirely absent, generalizes the values of the attribute.

In an exemplary embodiment, the present invention provides a formal language 1000 that specifies lexical properties of tokens and rules for combining tokens, as described below. The formal language 1000 specifies an unbounded collection of valid expressions; markup is valid if it corresponds to a valid expression in the formal language 1000.

A valid expression in the formal language 1000 of the invention is a possibly empty sequence of textual content and markup elements.

A markup element includes an open character, a textual tag name, an optional predicate segment, an optional body, and a close character.

The optional predicate segment, if present, consists of one or more predicates. If there is more than one predicate, the individual predicates are separated by a predicate separator character. Each individual predicate includes a textual relation and, optionally, one or more textual complements. Plural complements are separated by a complement separator character.

The optional body, where present, includes a body separator character, and a possibly empty sequence of textual content and markup elements.

In an exemplary embodiment, the open character and close character are defined as the open and close curly bracket characters, respectively. The predicate separator character is defined as the semicolon and the complement separator character is defined as the comma. The body separator character is defined as the vertical bar.

2 Processing Markup

FIG. 2 depicts an exemplary embodiment of a system for processing markup. The markup is processed by a driver 1002, which reads the markup and generates a sequence of requests. The requests are specified by an interface 1004. An application-specific client 1006 responds to the requests. In consequence of the responses of the client 1006 to the requests of the driver 1002, application-specific processing by the client 1006 may ensue.

The driver 1002 implements the formal language 1000. The implementation of the formal language 1000 provides the capability for detection of elements in a text stream. The implementation makes use of syntax-directed translation, aspects of which will be known to those of ordinary skill in the art, as illustrated, for example, by the book "Compilers" by Alfred V. Aho, Ravi Sethi, and Jeffrey D. Ullman, Addison-Wesley Publishing Company, 1986, ISBN 0-201-10088-6. Another useful reference, oriented towards popular Unix tools, is the book "Lex and Yacc, 2nd Ed.", by John R. Levine, Tony Mason, and Doug Brown, O'Reilly and Associates, Inc., 1992, ISBN 1-56592-000-7. Each of these references in incorporated herein by reference.

FIG. 4 depicts an exemplary embodiment of the driver 1002 for processing markup to requests from the interface 1004 directed to the client 1006. A lexical analyzer 1008 processes markup as a text stream to produce terminal tokens 1010. The lexical analyzer 1008 thus detects lexical elements in the text stream. The terminal tokens 1010 are processed by a syntax analyzer 1012, which manipulates terminal and nonterminal tokens in accordance with the formal language 1000. The lexical analyzer 1008 thus detects structural elements in the text stream. In the course of lexical analysis, the lexical analyzer 1008 generates lexical notifications 1014, which are directed to a parse responder 1016. The parse responder 1016 is also the recipient of syntactic notifications 1018, which are generated by the syntax analyzer 1012 in the course of syntax analysis. The notifications indicate particular detection events in the markup processing. Specialized processing may take place in response to the notifications. To facilitate specialized processing, the terminal and nonterminal tokens of the formal language 1000 may be associated with grammar objects drawn from classes which represent elements to which the formal language 1000 makes reference. The specialized processing enables a semantic response to syntactic structure. In the driver 1002, the specialized processing is directed to a client driver 1020, which generates requests in accordance with the interface 1004, directed to the client 1006.

3 Object-Oriented Interface for Processing Markup

FIG. 3 depicts an exemplary embodiment of the interface 1004. The interface 1004 specifies a collection of requests which govern interactions between the driver 1002, which generates the requests, and the client 1006, which responds to the requests. The client 1006 includes a single instance of a class client-model 1022 and one or more instances of a class client-element 1024. An instance of the client-model 1022 typically encapsulates an application-specific object-oriented data structure which is produced by processing the markup. The client-model 1022 corresponds to the totality of the processed markup, including one or more documents. An instance of the client-element 1024 corresponds to a particular markup element; typically an instance of the client-element 1024 represents an entity which is meaningful in the context of an application. The interface 1004 also makes use of a scalar class text 1026, an instance of which represents an instance of textual content or other textual data.

An instance of the client-model 1022 typically encapsulates an application-specific object-oriented data structure which is produced by processing the markup. The model instance corresponds to the totality of the processed markup, including one or more documents. The model instance responds to a request construct-element 1028, which is requested when a start tag is detected in the markup. The model instance responds to a request accept-root-element 1030, which is requested when a root instance of the client-element 1024 has been successfully processed from markup. The model instance responds to a request accept-root-text 1032, which is requested when root text is detected in the markup.

An instance of the client-element 1024 corresponds to a markup element. A markup element includes a start tag, optional attributes, an optional body containing nested markup elements and text, and an end tag. The element instance responds to a request accept-attribute 1034, which is requested when an attribute is detected in the start tag of the corresponding markup element. The element instance responds to a request configure 1036, which is requested after all the attributes in the start tag have been processed, but before any text or markup elements have been processed from the body of the corresponding markup element. The element instance responds to a request accept-element 1038, which is requested when a nested markup element has been successfully processed from the body of the corresponding markup element. The element instance responds to a request accept-text 1040, which is requested when an instance of textual content has been processed from the body of the corresponding markup element. The element instance responds to a request commit 1042, which is requested when the end tag of the corresponding markup element has been detected.

4 Grammar Classes

In the notifications generated by the lexical analyzer 1008 and the syntax analyzer 1012, the driver 1002 makes use of grammar objects which are associated with the tokens that are referenced in the formal language 1000. The grammar objects are drawn from classes which represent elements to which the formal language 1000 makes reference. The grammar classes include a class element 1044, a class leaf 1046, a class node 1048, and a class predicate 1050. FIG. 5 depicts an exemplary embodiment of the classes element 1044, leaf 1046, node 1048, and predicate 1050. An instance of the element 1044 represents any grammary object. The element 1044 serves as a base class for the leaf 1046, the node 1048, and the predicate 1050. An instance of the leaf 1046 represents textual content in markup. A textual member text 1052 contains the textual content. An instance of the predicate 1050 represents a markup predicate. In the formal language 1000, a predicate includes a relation, and, optionally, one or more complements. A textual member relation 1054 contains the relation of the predicate. A sequence member complements 1056 contains the complements of the predicate, if any. An instance of the node 1048 represents a markup element. A textual member name 1058 contains the tag name. Additional member functions to provide access to the members are provided in an alternative embodiment. Such additional member functions are trivial to one skilled in the art and hence not shown.

5 Lexical Analysis

The lexical analysis of the formal language 1000 makes use of several lexical states corresponding to distinct contexts in the markup. A state initial 1060 corresponds to the root level and the body of a markup element. A state head 1062 corresponds to the tag name and attributes of a markup element. A state double-quote 1064 corresponds to the interior of a double-quoted complement of a predicate. A state single-quote 1066 corresponds to the interior of a single-quoted complement of a predicate.

FIG. 6 depicts an exemplary embodiment of lexical matches for the initial 1060 of the formal language 1000. A match 1068 detects and ignores shell-style comments. A match 1070 detects a newline in the markup content. The match 1070 returns a white-terminal 1072. The white-terminal 1072 is associated with an instance of the leaf 1046, in which the text 1052 contains whitespace. The match 1070 triggers a lexical responder body-newline 1074, in which the parser may keep track of line count for status and error reporting. The body-newline 1074 constructs an instance of the leaf 1046 which will be associated with the white-terminal 1072. A match 1076 detects other whitespace in the markup content. The match 1076 returns the white-terminal 1072. The match 1076 triggers a lexical responder body-white.1078. The body-white 1078 constructs an instance of the leaf 1046 which will be associated with the white-terminal 1072.

A match 1080 detects the opening of a markup element. The match 1080 returns a open-terminal 1082. The match 1080 transfers the lexer state to the head 1062, in which the name and predicates of the markup element will be processed.

A match 1084 detects the closing of a markup element. The match 1084 returns a close-terminal 1086.

A match 1088 detects an escaped open character, permitting the embedding of a literal open character in textual content. The match 1088 returns a black-terminal 1090. The black-terminal 1090 is associated with an instance of the leaf 1046. The match 1088 triggers a lexical responder escape-open 1092. The escape-open 1092 constructs an instance of the leaf 1046 the text 1052 of which contains a literal open character, which will be associated with the black-terminal 1090.

A match 1094 detects an escaped close character, permitting the embedding of a literal close character in the textual markup. The match 1094 returns the black-terminal 1090. The match 1094 triggers a lexical responder escape-close 1096. The escape-open 1092 constructs an instance of the leaf 1046, the text 1052 of which contains a literal close character, which will be associated with the black-terminal 1090.

A match 1098 detects any other character. The match 1098 returns the black-terminal 1090. The match 1098 triggers a lexical responder black 1100. The black 1100 constructs an instance of the leaf 1046, the text 1052 of which contains the matched character which will be associated with the black-terminal 1090.

FIG. 7 depicts an exemplary embodiment of lexical matches for the head 1062 of the formal language 1000. The head 1062 corresponds to the tag name and predicates of a markup element.

A match 1102 detects the body separator character which marks the end of the opening of the markup element and the beginning of the body of the markup element. The match 1102 returns a bar-terminal 1104. The match 1102 transfers the lexer state to the initial 1060, in which textual content and nested tagged markup element may occur.

A match 1106 detects the complement separator character, that joins plural complements in a predicate. The match 1106 returns a comma-terminal 1108.

A match 1110 detects the predicate separator character, which joins plural predicates in the head of a markup element. The match 1110 returns a semicolon-terminal 1112.

A match 1114 detects and ignores whitespace in the head of a markup element.

A match 1116 detects a newline in the head of a markup element. The match 1116 triggers a lexical responder head-newline 1118, in which the parser may keep track of line count for status and error reporting.

A match 1120 detects an opening double-quote in the head of a markup element. The match 1120 transfers the lexer state to the double-quote 1064. The match 1120 triggers a lexical responder quote-open 1122, indicating that subsequent characters should be accumulated.

A match 1124 detects an opening double-quote in the head of a markup element. The match 1124 transfers the lexer state to the single-quote 1066. The match 1124 triggers the lexical responder quote-open 1122, indicating that subsequent characters should be accumulated.

A match 1126 detects a string of alphanumeric characters in the head of a markup element. The match 1126 returns a name-terminal 1128. The name-terminal 1128 is associated with an instance of the leaf 1046; the text 1052 contains the detected string. The name-terminal 1128 may represent a tag name, a relation, or an complement. The match 1126 triggers a lexical responder name 1130, which constructs the associated leaf 1046.

A match 1132 detects the close character, which indicates the end of a markup element. The match 1132 returns the close-terminal 1086. The match 1132 transfers the lexer state to the initial 1060.

A match 1134 matches any other character, none of which are permitted in this context. The match 1134 triggers a lexical responder bad-character 1136, which reports an error.

FIG. 8 depicts an exemplary embodiment of lexical matches for the double-quote 1064 of the formal language 1000. The double-quote 1064 accumulates textual content inside a double-quoted predicate complement.

A match 1138 detects a closing double-quote. The match 1138 returns a quote-terminal 1140. The quote-terminal 1140 is associated with an instance of the leaf 1046, the text 1052 of which contains the quoted textual content (from which the bracketing quotes have been stripped). The match 1138 transfers the lexer state to the head 1062. The match 1138 triggers a lexical responder quote-close 1142, in which the associated instance of the leaf 1046 is constructed.

A match 1144 detects an escaped double-quote, thus permitting a literal double-quote inside a double-quoted predicate complement. The match 1144 triggers a lexical responder escape-doublequote 1146. The escape-double-quote 1146 accumulates a literal double-quote character to the textual content.

A match 1148 detects a newline inside a double-quoted predicate complement. In the exemplary embodiment, a newline inside a double-quoted predicate complement is forbidden, since it is such a common error to leave an unclosed quote. In an alternative embodiment, embedded newlines in quotes could be permitted. In another alternative embodiment, an escape code could be used to embed a newline in a double-quoted predicate complement. The match 1148 triggers a lexical responder quote-newline 1150, which fails in this embodiment.

A match 1152 detects any other character in a double-quoted predicate complements. The match 1152 triggers a lexical responder quote-accumulate 1154, which accumulates the detected character to the textual content.

FIG. 9 depicts an exemplary embodiment of lexical matches for the single-quote 1066 of the formal language 1000. The single-quote 1066 accumulates textual content inside a single-quoted predicate complement.

A match 1156 detects a closing single-quote. The match 1156 returns a quote-terminal 1140. The quote-terminal 1140 is associated with an instance of the leaf 1046, the text 1052 of which contains the quoted textual content (from which the bracketing quotes have been stripped). The match 1156 transfers the lexer state to the head 1062. The match 1156 triggers a lexical responder quote-close 1142, in which the associated instance of the leaf 1046 is constructed.

A match 1158 detects an escaped single-quote, thus permitting a literal single-quote inside a single-quoted predicate complement. The match 1158 triggers a lexical responder escape-singlequote 1160. The escape-singlequote 1160 accumulates a literal single-quote character to the textual content.

A match 1162 detects a newline inside a single-quoted predicate complement. In the exemplary embodiment, a newline inside a single-quoted predicate complement is forbidden, since it is such a common error to leave an unclosed quote. In an alternative embodiment, embedded newlines in quotes could be permitted. In another alternative embodiment, an escape code could be used to embed a newline in a single-quoted predicate complement. The match 1162 triggers a lexical responder quote-newline 1150, which fails in this embodiment.

A match 1164 detects any other character in a single-quoted predicate complements. The match 1 64 triggers a lexical responder quote-accumulate 1154, which accumulates the detected character to the textual content.

6 Syntax Analysis

FIG. 10 depicts an exemplary embodiment of the syntax analyzer 1012 for the formal language 1000. The formal syntax includes a set of rules, each of which includes a nonterminal left-hand side, and a right-hand side consisting of a (possibly empty) sequence of tokens, including terminals and nonterminals. Certain tokens are associated with an instance of the element 1044. Each token is also characterized by a unique integer code.

Each rule in the syntax analyzer 1012 is optionally associated with a syntax responder. The responder carries out the "translation" in syntax-directed translation. When the left-hand side nonterminal of the rule is associated with an instance of the element 1044, the responder must assign the associated instance. In the absence of a responder, the instance associated with the first right-hand side token is associated with the left-hand side nonterminal. In the exemplary embodiment, each responder is a member function of a class parse-responder 1166.

A rule 1168 produces a nonterminal start 1170 from an empty token sequence. The start 1170 corresponds to the entire markup stream. The rule 1168 indicates that an empty stream of markup is a valid markup stream.

A rule 1172 produces the start 170. The rule 172 consumes the start 170 and a leaf 1174. The leaf 1174 represents an instance of the leaf 1046, corresponding to an instance of textual content. The rule 1172 indicates that a valid markup stream followed by an instance of textual content is a valid markup stream. The rule 1172 triggers a syntax responder accept-leaf 1176 which forwards the associated instance of the leaf 1046 to the parse-responder 1166, eventually resulting in the generation of the client request accept-root-text 1032.

A rule 1178 produces the start 1170. The rule 1178 consumes the start 1170 and a nonterminal node 1180. The node 1180 is associated with an instance of the node 1048, corresponding to a markup element. The rule 1178 indicates that a valid markup stream followed by a markup element is a valid markup stream. The rule 1178 triggers a syntax responder accept-node 1182 which forwards the associated instance of the node 1048 to the parse-responder 1166 eventually resulting in the generation of the client request accept-root-element 1030.

A rule 1184 produces the node 1180. The rule 1184 consumes a nonterminal head 1186 and the close-terminal 1086. The head 1186 is associated with a head instance of the node 1048 for which a tag name and, optionally, predicates, have been processed. The rule 1184 indicates the validity of a markup element consisting of a tag name and optional predicates. In other words, the body of a markup element is optional.

The rule 1184 triggers a syntax responder configure-commit-node 1188, which associates the head instance of the node 1048 with the left-hand side node 1180. The configure-commit-node 1188 forwards the head instance of the node 1048 to the parse-responder 1166 eventually resulting in the generation of the client request configure 1036 and the client request commit 1042.

A rule 1190 produces the node 1180. The rule 1190 consumes a nonterminal body 1192 and the close-terminal 1086. The body 1192 is associated with a body instance of the node 1048 for which the head of a markup element has been processed.

The rule 1190 triggers a syntax responder commit-node 1194 which associates the body instance of the node 1048 with the left-hand side node 1180. The commit-node 1194 forwards the body instance of the node 1048 to the parse-responder 1166 eventually resulting in the generation of the client request commit 1042.

A rule 1196 produces the body 1192. The rule 1196 consumes the head 1186 and the bar-terminal 1104. The head 1186 is associated with a head instance of the node 1048 for which a tag name and, optionally, predicates, have been processed. The rule 1196 indicates the transition from processing the head to the body of a markup element.

The rule 1196 triggers a syntax responder configure-node 1198 which associates the head instance of the node 1048 with the left-hand side body 1192. The configure-node 1198 forwards the head instance of the node 1048 to the parse-responder 1166 eventually resulting in the generation of the client request configure 1036.

A rule 1200 produces the body 1192. The rule 1200 consumes the body 1192 and the leaf 1174. The right-hand side body 1192 is associated with a body instance of the node 1048 for which the head of a markup element has been processed. The leaf 1174 is associated with an instance of the leaf 1046, corresponding to an instance of textual content. The rule 1200 indicates the validity of appending an instance of textual content to the body of a markup element.

The rule 1200 triggers a syntax responder node-accept-leaf 1202, which associates the body instance of the node 1048 with the left-hand side body 1192. The configure-node 1198 forwards the body instance of the node 1048 and the leaf instance of the leaf 1046 to the parse-responder 1166 eventually resulting in the generation of the client request accept-text 1040.

A rule 1204 produces the body 1192. The rule 1204 consumes the body 1192 and the node 1180. The right-hand side body 1192 is associated with a body instance of the node 1048 for which the head of a markup element has been processed. The node 1180 is associated with a nested instance of the node 1048. The rule 1204 indicates the validity of appending a nested markup element to the body of a markup element.

The rule 1204 triggers a syntax responder node-accept-node 1206, which associates the body instance of the node 1048 with the left-hand side body 1192. The node-accept-node 1206 forwards the body instance of the node 1048 and the nested instance of the node 1048 to the parse-responder 1166 eventually resulting in the generation of the client request accept-element 1038.

A rule 1208 produces the head 1186. The rule 1208 consumes a tag 1210. The tag,1210 represents a tag instance of the node 1048 for which only the tag name has been processed. The tag instance of the node 1048 is associated with the left-hand side head 1186. The rule 1208 indicates the validity of a markup element head consisting only of a tag.

A rule 1212 produces the head 1186. The rule 1212 consumes the tag 1210 and a pred 1214. The tag 1210 represents a tag instance of the node 1048 for which only the tag name has been processed. The pred 1214 represents an instance of the predicate 1050. The rule 1212 indicates the validity of a markup element head consisting of a tag and a single predicate.

The rule 1212 triggers a syntax responder node-accept-first-predicate 1216, in which the tag instance of the node 1048 is associated with the left-hand side head 1186. The node-accept-first-predicate 1216 forwards the tag instance of the node 1048 and the instance of the predicate 1050 to the parse-responder 1166, eventually resulting in one or more generations of the client request accept-attribute 1034.

A rule 1218 produces the head 1186. The rule 1218 consumes the head 1186, the semicolon-terminal 1112, and the pred 1214. The tag 1210 represents a tag instance of the node 1048 for which only the tag name has been processed. The pred 1214 represents an instance of the predicate 1050, corresponding to one or more attributes. The rule 1218 indicates the validity of a markup element head consisting of a tag and a plurality of predicates separated by a predicate separator character.

The rule 1218 triggers a syntax responder node-accept-predicate 1220, in which the tag instance of the node 1048 is associated with the left-hand side head 1186. The node-accept-predicate 1220 forwards the tag instance of the node 1048 and the instance of the predicate 1050 to the parse-responder 1166, eventually resulting in one or more generations of the client request accept-attribute 1034.

A rule 1222 produces the tag 1210. The rule 1222 consumes the open-terminal 1082 and the name-terminal 1128. The name-terminal 1128 is associated with an instance of the leaf 1046, corresponding to the tag of a markup element. The rule 1222 indicates the opening of a markup element.

The rule 1222 triggers a syntax responder construct-node 1224, in which an instance of the node 1048 is constructed and associated with the left-hand side tag 1210. The construct-node 1224 forwards the instance of the leaf 1046 to the parse-responder 1166, eventually resulting in the client request construct-element 1028.

A rule 1226 produces the pred 1214. The rule 1226 consumes a nonterminal relation 1228. The relation 1228 is associated with an instance of the leaf 1046. The rule 1226 indicates a predicate for which the complement is absent.

The rule 1226 triggers a syntax responder predicate 1230, in which an instance of the predicate 1050 is constructed and associated with the left-hand side pred 1214. The text 1052 of the instance of the leaf 1046 is used to inititalize the relation 1054 of the newly constructed instance of the predicate 1050.

A rule 1232 produces the pred 1214. The rule 1232 consumes the relation 1228 and a non-terminal complement 1234. The relation 1228 is associated with a relation instance of the leaf 1046. The complement 1234 is associated with an complement instance of the leaf 1046. The rule 1232 indicates a predicate with a single complement.

The rule 1232 triggers a syntax responder predicate-complement 1236, in which an instance of the predicate 1050 is constructed and associated with the left-hand side pred 1214. The text 1052 of the relation instance of the leaf 1046 is used to inititalize the relation 1054 of the newly constructed instance of the predicate 1050. The text 1052 of the complement instance of the leaf 1046 is used to inititalize the complements 1056 of the newly constructed instance of the predicate 1050.

A rule 1238 produces the pred 1214. The rule 1238 consumes the pred 1214, the comma-terminal 1108, and the complement 1234. The pred 1214 is associated with a predicate instance of the predicate 1050. The complement 1234 is associated with an complement instance of the leaf 1046. The rule 1238 indicates a predicate with plural complements.

The rule 1238 triggers a syntax responder predicate-plural-complement 1240, in which the predicate instance of the predicate 1050 is associated with the left-hand side pred 1214. The text 1052 of the complement instance of the leaf 1046 is appended to the complements 1056 of the predicate instance of the predicate 1050.

A rule 1242 produces the relation 1228. The rule 1242 consumes the name-terminal 1128. The name-terminal 1128 is associated with an instance of the leaf 1046. The leaf instance is associated with the left-hand side relation 1228. The rule 1242 indicates the validity of an alphanumeric identifier for the relation of a predicate.

A rule 1244 produces the complement 1234. The rule 1244 consumes the name-terminal 1128. The name-terminal 1128 is associated with an instance of the leaf 1046. The leaf instance is associated with the left-hand side complement 1234. The rule 1242 indicates the validity of an alphanumeric identifier for an complement of a predicate.

A rule 1246 produces the complement 1234. The rule 1246 consumes a nonterminal quote 1248. The quote 1248 is associated with an instance of the leaf 1046. The leaf instance is associated with the left-hand side complement 1234. The rule 1246 indicates the validity of quoted textual data for an complement of a predicate.

A rule 1250 produces the quote 1248. The rule 1250 consumes the quote-terminal 1140. The quote-terminal 1140 is associated with an instance of the leaf 1046. The leaf instance is associated with the left-hand side quote 1248. The rule 1250 indicates the validity of a single instance of quoted textual data as a quote.

A rule 1252 produces the quote 1248. The rule 1252 consumes the quote 1248 and the quote-terminal 1140. The right-hand side quote 1248 is associated with a quote instance of the leaf 1046. The quote-terminal 1140 is associated with a terminal instance of the leaf 1046. The rule 1250 indicates the validity of concatentation of plural instances of quoted textual data to form a quote. This is the same convention as is used by the C compiler to facilitate strings too long to conveniently fit on a single line.

The rule 1252 triggers a syntax responder accumulate 1254 which associates the quote leaf instance with the left-hand side quote 1248. The accumulate 1254 appends the text 1052 of the terminal leaf instance to the text 1052 of the quote leaf instance.

A rule 1256 produces the leaf 1174. The rule 1256 consumes a nonterminal black 1258. The black 1258 is associated with an instance of the leaf 1046. The leaf instance is associated with the left-hand side leaf 1174. The rule 1256 indicates the validity of non-whitespace textual data as an instance of textual content.

A rule 1260 produces the leaf 1174. The rule 1260 consumes a white 1262. The white 1262 is associated with an instance of the leaf 1046. The leaf instance is associated with the left-hand side leaf 1174. The rule 1260 indicates the validity of whitespace textual data as an instance of textual content.

A rule 1264 produces the white 1262. The rule 1264 consumes the white-terminal 1072. The white-terminal 1072 is associated with an instance of the leaf 1046. The leaf instance is associated with the left-hand side white 1262. The rule 1264 indicates the validity of a single span of whitespace as an instance of textual content.

A rule 1266 produces the white 1262. The rule 1266 consumes the white 1262 and the white-terminal 1072. The white 1262 is associated with an white instance of the leaf 1046. The white-terminal 1072 is associated with a terminal instance of the leaf 1046. The rule 1266 triggers the syntax responder accumulate 1254, which associates the white instance with the left-hand side white 1262. The accumulate. 1254 appends the text 1052 of the terminal instance to the text 1052 of the white instance.

A rule 1268 produces the black 1258. The rule 1268 consumes the black-terminal 1090. The black-terminal 1090 is associated with an instance of the leaf 1046. The leaf instance is associated with the left-hand side black 1258. The rule 1268 indicates the validity of a single span of non-white text as an instance of textual content.

A rule 1270 produces the black 1258. The rule 1270 consumes the black 1258 and the black-terminal 1090. The black 1258 is associated with an black instance of the leaf 1046. The black-terminal 1090 is associated with a terminal instance of the leaf 1046. The rule 1270 triggers the syntax responder accumulate 1254, which associates the black instance with the left-hand side black 1258. The accumulate 1254 appends the text 1052 of the terminal instance to the text 1052 of the black instance.

7 Parse Responder

FIG. 11 depicts an exemplary embodiment of the class parse-responder 1166 which responds to the syntax-directed notifications of the formal language 1000. The parse-responder 1166 also provides pure virtual member functions which are implemented by the client-driver 1272 for the translation to requests from the interface 1004. A member function parse 1274 activates markup processing from a supplied file handle. In the exemplary embodiment, the implmentation of syntax-directed translation uses a parser generated by bison and a lexical analyzer generated by flex; the use of these tools will be known to one of ordinary skill in the art. A textual member accumulator 1276 provides an accumulator for quoted text, which is delivered to the parse-responder 1166 character by character.

7.1 Lexical Responders

The parse-responder 1166 provides member functions corresponds to the lexer notifications of the formal language 1000. Each lexer responder member accepts an argument providing the textual data which matches the regular expression associated with the lexical match. The members may also accept an argument which provides a destination for an instance to be associated with the terminal token of the lexical match.

A member function body-white 1278 corresponds to the lexical responder body-white 1078. The body-white 1278 provides an instance of the leaf 1046, in which the supplied matching text is assigned to the leaf member text 1052.

A member function body-newline 1280 corresponds to the lexical responder body-newline 1074. The body-newline 1280 provides an instance of the leaf 1046, in which the supplied matching text is assigned to the leaf member text 1052.

A member function escape-open 1282 corresponds to the lexical responder escape-open 1092. The escape-open 1282 provides an instance of the leaf 1046, in which a literal open character is assigned to the leaf member text 1052.

A member function escape-close 1284 corresponds to the lexical responder escape-close 1096. The escape-close 1284 provides an instance of the leaf 1046, in which a literal close character is assigned to the leaf member text 1052.

A member function name 1286 corresponds to the lexical responder name 1130. The name 1286 provides an instance of the leaf 1046, in which the supplied matching text is assigned to the leaf member text 1052.

A member function black 1288 corresponds to the lexical responder black 1100. The black 1288 provides an instance of the leaf 1046, in which the supplied matching text is assigned to the leaf member text 1052.

A member function head-newline 1290 corresponds to the lexical responder head-newline 1118. The head-newline 1290 ignores the supplied matching text. In an alternative embodiment, a line counter is maintained to facilitate reporting.

A member function quote-open 1292 corresponds to the lexical responder quote-open 1122. The quote-open 1292 clears the accumulator 1276 in preparation to accumulate quoted text.

A member function bad-character 1294 corresponds to the lexical responder bad-character 1136. The bad-character 1294 generates an error due to an unacceptable character in the head of a markup element.

A member function quote-close 1296 corresponds to the lexical responder quote-close 1142. The quote-close 1296 provides an instance of the leaf 1046, in which the supplied matching text is taken from the accumulator 1276.

A member function escape-doublequote 1298 corresponds to the lexical responder escape-doublequote 1146. The escape-doublequote 1298 accumulates a literal double-quote character to the accumulator 1276.

A member function quote-newline 1300 corresponds to the lexical responder quote-newline 1150. The quote-newline 1300 generates an error due to a quoted string extending over more than one line.

A member function quote-accumulate 1302 corresponds to the lexical responder quote-accumulate 1154. The quote-accumulate 1302 accumulates the supplied text to the accumulator 1276.

A member function escape-singlequote 1304 corresponds to the lexical responder escape-singlequote 1160. The escape-singlequote 1304 accumulates a literal single-quote character to the accumulator 1276.

7.2 Syntax Responders

The parse-responder 1166 provides member functions corresponding to the syntactic notifications 1018 of the formal language 1000. Each responder member function accepts an argument corresponding to the left-hand side of the associated rule. Each responder member also accepts an argument for each of the right-hand side tokens in the associated rule, if any. The types of the arguments correspond to the classes associated with the tokens otherwise the argument types are integers, containing the integer code for the particular token. If the left-hand side has an associated class, the responder member function must to assign the left-hand association.

A member function accept-leaf 1306 corresponds to the syntax responder accept-leaf 1176. The accept-leaf 1306 uses the supplied instance of the leaf 1046 to invoke the pure virtual request-accept-root-text 1308. There is no left-hand side association.

A member function accept-node 1310 corresponds to the syntax responder accept-node 1182. The accept-node 1310 uses the supplied instance of the node 1048 to invoke the pure virtual request-accept-root-element 1312. There is no left-hand side association.

A member function configure-commit-node 1314 corresponds to the syntax responder configure-commit-node 1188. The configure-commit-node 1314 uses the supplied instance of the node 1048 to invoke the pure virtual request-configure 1316 and the pure virtual request-commit 1318. The supplied instance of the node 1048 is assigned to the left-hand association.

A member function commit-node 1320 corresponds to the syntax responder commit-node 1194. The commit-node 1320 uses the supplied instance of the node 1048 to invoke the pure virtual request-commit 1318. The supplied instance of the node 1048 is assigned to the left-hand association.

A member function configure-node 1322 corresponds to the syntax responder configure-node 1198. The configure-node 1322 uses the supplied instance of the node 1048 to invoke the pure virtual request-configure 1316. The supplied instance of the node 1048 is assigned to the left-hand association.

A member function node-accept-leaf 1324 corresponds to the syntax responder node-accept-leaf 1202. The node-accept-leaf 1324 uses the supplied instance of the node 1048 and the supplied instance of the leaf 1046 to invoke the pure virtual request-accept-text 1326. The supplied instance of the node 1048 is assigned to the left-hand association.

A member function node-accept-node 1328 corresponds to the syntax responder node-accept-node 1206. The node-accept-node 1328 uses the first supplied instance of the node 1048 and the second nested instance of the node 1048 to invoke the pure virtual request-accept-element 1330. The first supplied instance of the node 1048 is assigned to the left-hand association.

A member function node-accept-first-predicate 1332 corresponds to the syntax responder node-accept-first-predicate 1216. The node-accept-first-predicate 1332 uses the supplied instance of the node 1048 and the supplied instance of the predicate 1050 to invoke the pure virtual request-accept-attribute 1334 one or more times according to the complements 1056 of the supplied instance of the predicate 1050. If the complements 1056 is empty, a single invocation of the pure virtual request-accept-attribute 1334 is generated, providing the relation 1054 as key and an empty value indicative of the absent complement. Otherwise, for each textual instance of the complements 1056, an invocation of the pure virtual request-accept-attribute 1334 is generated, providing the relation 1054 as key and the textual instance as value. The supplied instance of the node 1048 is assigned to the left-hand association.

A member function node-accept-predicate 1336 corresponds to the syntax responder node-accept-predicate 1220. The node-accept-predicate 1336 uses the supplied instance of the node 1048 and the supplied instance of the predicate 1050 to invoke the pure virtual request-accept-attribute 1334 one or more times according to the complements 1056 of the supplied instance of the predicate 1050, as described above. The supplied instance of the node 1048 is assigned to the left-hand association.

A member function predicate 1338 corresponds to the syntax responder predicate 1230. The predicate 1338 uses the supplied instance of the leaf 1046 to initialize the relation 1054 of a newly constructed instance of the predicate 1050. The newly constructed instance of the predicate 1050 is assigned to the left-hand association.

A member function predicate-complement 1340 corresponds to the syntax responder predicate-complement 1236. The predicate-complement 1340 uses the first supplied instance of the leaf 1046 and the second supplied instance of the leaf 1046 to initialize the relation 1054 and the complements 1056, respectively, of a newly constructed instance of the predicate 1050. The newly constructed instance of the predicate 1050 is assigned to the left-hand association.

A member function predicate-plural-complement 1342 corresponds to the syntax responder predicate-plural-complement 1240. The predicate-plural-complement 1342 uses the supplied instance of the leaf 1046 to append the complements 1056 of the supplied instance of the predicate 1050. The supplied instance of the predicate 1050 is assigned to the left-hand association.

A member function construct-node 1344 corresponds to the syntax responder construct-node 1224. The construct-node 1344 uses the supplied instance of the leaf 1046 to provide the name 1058 for a newly constructed node 1048. The newly constructed node 1048 is used to invoke the pure virtual request-model-construct-element 1346. The newly constructed node 1048 is assigned to the left-hand association.

A member function accumulate 1348 corresponds to the syntax responder accumulate 1254. The accumulate 1348 appends the text 1052 from the second supplied instance of the leaf 1046 to the text 1052 of the first supplied instance of the leaf 1046. The first supplied instance of the leaf 1046 is assigned to the left-hand association.

7.3 Pure Virtual Parse Requests

FIG. 12 continues the depiction of an exemplary embodiment of the class parse-responder 1166.

The parse-responder 1166 defines certain additional virtual member functions, which are provided by a template class client-driver 1272. The client-driver 1272 is parameterized by a class client-model 1350 and a class client-element 1352. The client-model 1350 specializes the client-model 1022, and the client-model 1350 specializes the client-element 1024. Thus, the formal language 1000 acts through the parse-responder 1166 and the client-driver 1272 to embody the driver 1002. In an alternative embodiment, the parse-responder 1166 and the client-driver 1272 could be combined into a single parameterized class. However, such an embodiment would needlessly duplicate generated code for the lexical and rule-directed responders, which are independent of the parameter classes, the client-model 1350 and theh client-element 1352.

The parse-responder 1166 provides pure virtual member functions which are implemented by the client-driver 1272 for the translation to requests from the interface 1004. A pure virtual member function request-model-construct-element 1346 accepts as an argument an instance of the node 1048. A pure virtual member function request-accept-root-element 1312 accepts as an argument an instance of the node 1048. A pure virtual member function request-accept-root-text 1308 accepts as an argument an instance of the leaf 1046. A pure virtual member function request-accept-attribute 1334 accepts as an argument an instance of the node 1048, and a pair of text arguments, corresponding the key and value of an attribute. A pure virtual member function request-configure 1316 accepts as an argument an instance of the node 1048. A pure virtual member function request-accept-element 1330 accepts as arguments an instance of the node 1048 and a nested instance of the node 1048. A pure virtual member function request-accept-text 1326 accepts as arguments an instance of the node 1048 and an instance of the leaf 1046. A pure virtual member function request-commit 1318 accepts as arguments an instance of the node 1048. These member functions invocations are translated by the client-driver 1272 to client requests from the interface 1004, as will be shown below.

8 Interface Driver

FIG. 13 depicts an exemplary embodiment of the template class client-driver 1272, specializing the parse-responder 1166. The client-driver 1272 is parameterized by a class client-model 1350 and a class client-element 1352. The client-model 1350 specializes the client-model 1022, and the client-model 1350 specializes the client-element 1024. The client-driver 1272 implements pure virtual member functions defined in the parse-responder 1166, translating invocations of those member functions to requests in the interface 1004.

A member model 1354, an instance of the client-model 1350, is the recipient of requests directed to the client-model 1022 in the interface 1004. A member stack 1356 is a stack of instances of the client-element 1352. The stack is a last-in, first-out sequence of elements which is well known to one skilled in the art. At any point in the parse, the instances of the client-element 1352 in the stack correspond to markup elements which have been started but have not yet ended.

A constructor 1358 accepts an instance of the client-model 1350. The supplied instance of the client-model 1350 is used to initialize the model 1354.

The client-model 1350 provides some private member functions. A private member function push 1360 pushes the supplied instance of the client-element 1352 on to the stack 1356. The newly pushed instance of the client-element 1352 becomes the topmost instance of the stack 1356. A private member function top 1362 returns the topmost instance of the client-element 1352 from the stack 1356, but does not alter the stack 1356. A private member function pop 1364 pops the topmost instance of the client-element 1352 from the stack 1356 and returns the popped instance of the client-element 1352. A private member function fail 1366 formats a supplied error message and return boolean false to indicate failure.

A member function request-model-construct-element 1368 specializes the pure virtual request-model-constructelement 1346. The client request construct-element 1028 is directed to the model 1354. The returned instance of the client-element 1352 is checked for nullity. If the returned element is nil, failure is returned. Otherwise, the returned instance is pushed onto the stack 1356 and success is returned.

A member function request-accept-root-element 1370 specializes the pure virtual request-accept-root-element 1312. The client request accept-root-element 1030 is directed to the model 1354. The accept-root-element 1030 is supplied with an instance of the client-element 1352, which is obtained by popping the stack 1356. The status of the invocation of the accept-root-element 1030 is returned.

A member function request-accept-root-text 1372 specializes the pure virtual request-accept-root-text 1308. The client request accept-root-text 1032 is directed to the model 1354. The accept-root-text 1032 is supplied with the instance of textual content which is obtained from the text 1052 of the supplied instance of the leaf 1046. The status of the invocation of the accept-root-text 1032 is returned.

A member function request-accept-attribute 1374 specializes the pure virtual request-accept-attribute 1334. The client request accept-text 1040 is directed to the topmost instance of the client-element 1352 on the stack 1356, The accept-attribute 1034 is supplied with the supplied key and value. The status of the invocation of the accept-attribute 1034 is returned.

A member function request-configure 1376 specializes the pure virtual request-configure 1316. The client request configure 1036 is directed to the topmost instance of the client-element 1352 on the stack 1356. The status of the invocation of the configure 1036 is returned.

A member function request-accept-element 1378 specializes the pure virtual request-accept-element 1330. The topmost instance of the client-element 1352 on the stack 1356 is popped. The client request accept-element 1038 is directed to the new topmost instance of the client-element 1352 on the stack 1356. The accept-element 1038 is supplied with the newly popped instance of the client-element 1352. The status of the invocation of the accept-element 1038 is returned.

A member function request-accept-text 1380 specializes the pure virtual request-accept-text 1326. The client request accept-text 1040 is directed to the topmost instance of the client-element 1352 on the stack 1356. The accept-text 1040 is supplied with the text 1052 from the supplied leaf 1046. The status of the invocation of the accept-text 1040 is returned.

A member function request-commit 1382 specializes the pure virtual request-commit 1318. The client request commit 1042 is directed to the topmost instance of the client-element 1352 on the stack 1356. The status of the invocation of the commit 1042 is returned.

9 Document-Object Client Implementation

To illustrate the driver 1002, an exemplary implementation of the client 1006 is required. An application converting markup expressed using the formal language 1000 to XML will be shown. The exemplary client will implement a simple version of the Document-Object Model (DOM), an early API for processing XML. The DOM provides a faithful object-oriented representation of the markup. The DOM is useful where there is no need to provide distinct classes to represent markup elements with distinct tags. Beware that the formal language 1000 is more permissive than XML on various structural requirements, so a valid expression in the formal language 1000 may not have a valid expression in XML.

Figure 15:
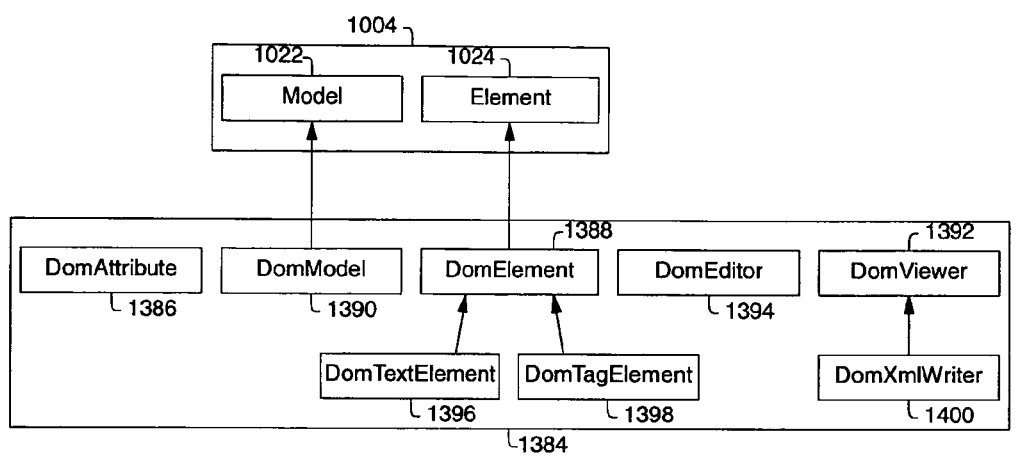
FIG. 15 depicts an exemplary embodiment of a document-object client implementation of the interface.

FIG. 15 depicts an exemplary embodiment of a dom-module 1384, providing a document-object client implementation of the interface 1004. The dom-module 1384 includes a class domattribute 1386, instances of which represent individual attributes. The dom-module 1384 includes a class dom-element 1388, which provides a client implementation of the client-element 1024. The dom-module 1384 includes a class dom-model 1390, which provides a client implementation of the client-model 1022. The dom-module 1384 includes a class dom-viewer 1392, which provides a handy base class from which read-only operators on instances of the dom-model 1390 and the dom-element 1388 may be derived. The dom-module 1384 includes a class dom-editor 1394, which provides a handy base class from which operators which edit instances of the dom-model 1390 and the dom-element 1388 may be derived. The dom-module 1384 includes a class dom-text-element 1396, a specialization of the dom-element 1388, which corresponds to textual elements in markup. The dom-module 1384 includes a class dom-tag-element 1398, a specialization of the dom-element 1388, which corresponds to tagged elements in markup. A class dom-xml-writer 1400, specializing the dom-viewer 1392, writes XML from an instance of the dom-model 1390.

The C++ keyword "struct" is used in certain class definitions in the examplary embodiment. This usage indicates that all of the depicted members and member functions have public scope (by default, members of a C++ class declared as a struct have public scope). In an alternative embodiment, the "class" keyword could be used, in which case, by default, members would have private scope. The struct convention is used here to avoid cluttering the depictions with access member functions. In an alternative embodiment, members would be private, with public member functions provided to get and set those data members, where necessary. Most member functions would remain public, but certain member functions could be made private where their access is not required outside the class implementation.

9.1 Document-Object Attribute

FIG. 16 depicts an exemplary embodiment of the class dom-attribute 1386. The dom-attribute 1386 corresponds to an attribute, which is a key, value text pair. The class dom-attribute 1386 thus includes two data members. A textual key 1402 represents the attribute key. A textual value 1404 represents the attribute value.

A dom-attribute 1406 is provided by the dom-attribute 1386. The dom-attribute 1406 receives a first argument of text 1026, which is used to initialize the key 1402. The dom-attribute 1406 receives a second argument of text 1026, which is used to initialize the value 1404.

9.2 Document-Object Element

FIG. 17 depicts an exemplary embodiment of the class dom-element 1388. The dom-element 1388 provides a client implementation of the client-element 1024.

A member function accept-attribute 1408 is provided by the dom-element 1388. The accept-attribute 1408 is responsive to the client request accept-attribute 1034, hence is responsible for processing an attribute which has been detected in the start tag of a markup element. The accept-attribute 1408 receives a first textual argument, representing the supplied attribute key. The accept-attribute 1408 receives a second textual argument, representing the supplied attribute value. The accept-attribute 1408 returns a boolean value, indicating whether the supplied attribute was accepted. The accept-attribute 1408 is a virtual member function which may be overridden by a specializing classes. By default, the accept-attribute 1408 returns boolean false, indicating that a supplied attribute was not handled. In an alternative embodiment, the default behavior could return boolean true, indicating that any supplied attribute is acceptable. In another alternative embodiment, the accept-attribute 1408 could be a pure virtual member function, in which case derived classes (specializations) would be required to provide an implementation.

A member function configure 1410 is provided by the dom-element 1388. The configure 1410 is responsive to the client request configure 1036, hence is responsible for configuration at the conclusion of the start tag of a markup element of markup. The configure 1410 returns a boolean value, indicating whether the responsive dom-element 1388 was successfully configured. By default, the configure 1410 returns boolean true, indicating a successful configuration. In an alternative embodiment, the default behavior could return boolean false, indicating that by default configuration fails. In another alternative embodiment, the configure 1410 could be a pure virtual member function, in which case derived classes (specializations) would be required to provide an implementation.

A member function accept-element 1412 is provided by the dom-element 1388. The accept-element 1412 is responsive to the client request accept-element 1038, hence is responsible for the receipt of a nested markup element in a subject containing markup element. The accept-element 1412 receives an argument, an instance of the dom-element 1388. The accept-element 1412 returns a boolean value, indicating whether the containing responsive dom-element 1388 accepted the provided nested dom-element 1388. By default, the accept-element 1412 returns boolean false, indicating that a supplied element was not handled. In an alternative embodiment, the default behavior could append the supplied element to the children and return boolean true, indicating that any supplied element is acceptable. In another alternative embodiment, the accept-element 1412 could be a pure virtual member function, in which case derived classes (specializations) would be required to provide an implementation.

A member function accept-text 1414 is provided by the dom-element 1388. The accept-text 1414 is responsive to the client request accept-text 1040 hence is responsible for the acceptance of textual content in a markup element. The accept-text 1414 receives an argument text 1416, of text 1026. The accept-text 1414 returns a boolean value, indicating whether the responsive dom-element 1388 accepted the provided text. By default, the accept-text 1414 returns boolean false, indicating that a supplied text was not handled. In an alternative embodiment, the default behavior could return boolean true, indicating that any supplied text is acceptable. In another alternative embodiment, the accept-text 1414 could be a pure virtual member function, in which case derived classes (specializations) would be required to provide an implementation.

A member function commit 1418 is provided by the dom-element 1388. The commit 1418 is responsive to the client request commit 1042 hence is responsible for any processing required at the end of a markup element. The commit 1418 receives an argument of dom-model 1390. The commit 1418 returns a boolean value, indicating whether the responsive dom-element 1388 was successfully committed. By default, the commit 1418 returns boolean true, indicating a successful commit. In an alternative embodiment, the default behavior could return boolean false, indicating that by default commit fails. In another alternative embodiment, the commit 1418 could be a pure virtual member function, in which case derived classes (specializations) would be required to provide an implementation.

A member function text-element 1420 is provided by the dom-element 1388. The text-element 1420 provides a safe downcast to an instance of the derived class -dom-text-element 1396. The text-element 1420 is a virtual member function; the default implementation returns null, indicating the failure of the downcast. In an alternative embodiment, run-time type identification could be used to provide a safe downcast.

A member function tag-element 1422 is provided by the dom-element 1388. The tag-element 1422 provides a safe downcast to an instance of the derived class dom-tag-element 1398. The tag-element 1422 is a virtual member function; the default implementation returns null, indicating the failure of the downcast. In an alternative embodiment, run-time type identification could be used to provide a safe downcast.

A member function dispatch-view 1424 is provided by the dom-element 1388. The dispatch-view 1424 provides a specializing dispatch to a dom-viewer 1392. The dispatch-view 1424 is a virtual member function which will be overridden by derived classes to provide a more particular specializing dispatch. The dispatch-view 1424 receives an argument of dom-viewer 1392, indicating the dispatch target. The dispatch-view 1424 returns bool, indicating whether the dispatched visit was successful.

9.3 Document-Object Viewer

FIG. 18 depicts an exemplary embodiment of the dom-viewer 1392. The dom-viewer 1392 provides a base class from which may be derived read-only visitors to an instance of the dom-model 1390 and its components.

A virtual destructor 1426 is provided by the dom-viewer 1392. The destructor 1426 is empty.

A member function view-model 1428 is provided by the dom-viewer 1392. The view-model 1428 receives an argument of dom-model 1390, the components of which are to be viewed. The view-model 1428 returns a boolean value indicating the success of the viewing.

A member function view-element 1430 is provided by the dom-viewer 1392. The view-element 1430 receives an argument of dom-element 1388, representing the instance of the dom-element 1388 which is to be viewed. The view-element 1430 returns a boolean value, indicating the success of the viewing. The default implementation returns one, indicating success.

A member function view-tag 1432 is provided by the dom-viewer 1392. The view-tag 1432 receives an argument of dom-tag-element 1398, representing the dom-tag-element 1398. The view-tag 1432 returns a boolean value, indicating the success of the viewing. The default view-tag 1432 implementation returns true; most derived classes will wish to specialize the view-tag 1432. In an alternative embodiment, the default implementation invokes the view of the base class; in this case, the view-element 1430. In another alternative embodiment, the view-element 1430 may dispatch to the instances of the children 1434 and the instances of the attribute-sequence 1436.

A member function view-text 1438 is provided by the dom-viewer 1392. The view-text 1438 receives an argument of dom-text-element 1396. The view-text 1438 returns a boolean value, indicating the success of the viewing. The default view-text 1438 implementation simply returns true; most derived classes will wish to specialize the view-text 1438. In an alternative embodiment, the default implementation invokes the view of the base class; in this case, the view-element 1430.

9.4 Document-Object Text Element

FIG. 19 depicts an exemplary embodiment of the class dom-text-element 1396. The class dom-text-element 1396 derives from (hence specializes) the class dom-element 1388. As a specialization of the dom-element 1388, the dom-text-element 1396 also implements the client-element 1024 from the interface 1004. The dom-text-element 1396 represents textual content from markup.

A textual member text 1440 is provided by the dom-text-element 1396. The text 1440 represents the actual textual content.

A constructor 1442 is provided by the dom-text-element 1396. The constructor 1442 receives a textual argument, which is used to initialize the text 1440.

A member function accept-attribute 1444 is provided by the dom-text-element 1396. The accept-attribute 1444 specializes the accept-attribute 1408, thus implementing the client request accept-attribute 1034. The accept-attribute 1444 simply returns false, indicating the unacceptability of an attempt to assign an attribute to textual content.

A member function configure 1446 is provided by the dom-text-element 1396. The configure 1446 specializes the configure 1410, thus implementing the client request configure 1036. The configure 1446 returns false indicating the unacceptability of an attempt to configure textual content.

A member function accept-element 1448 is provided by the dom-text-element 1396. The accept-element 1448 specializes the accept-element 1412, thus implementing the client request accept-element 1038. The accept-element 1448 returns false, indicating the unacceptability of an attempt to nest a markup element within textual content.

A member function accept-text 1450 is provided by the dom-text-element 1396. The accept-text 1450 specializes the accept-text 1414, thus implementing the client request accept-text 1040. The accept-text 1450 returns false, indicative that the textual content of the dom-text-element 1396 is fixed at construction time.

A member function commit 1452 is provided by the dom-text-element 1396. The commit 1452 specializes the commit 1418, thus implementing the client request commit 1042. The commit 1452 returns false, indicating the unacceptability of an attempt to commit textual content.

Although the dom-text-element 1396 does not successfully respond to any of the clients request directed toward the client-element 1024, there are benefits to having the dom-text-element 1396 specialize the dom-element 1388, especially convenient traversal by the dom-viewer 1392. In general a representation of a markup element must provide access to a heterogeneous sequence of children, arbitrarily mixing nested markup elements with textual content. A uniform representation encompassing text and markup elements eases the difficulties of managing a heterogeneous collection.

A member function text-element 1454 is provided by the dom-text-element 1396. The text-element 1454 specializes the safe downcast text-element 1420. The text-element 1454 successfully returns the responsive dom-text-element 1396.

A member function dispatch-view 1456 is provided by the dom-text-element 1396. The dispatch-view 1456 specializes the dispatch-view 1424. The dispatch-view 1456 receives an argument of dom-viewer 1392. The view-text 1438 is requested of the supplied dom-viewer 1392 and with argument the responsive dom-text-element 1396. The dispatch-view 1456 returns a boolean value indicating the success of the view-text 1438 invocation.

9.5 Document-Object Tag Element

FIG. 20 depicts an exemplary embodiment of the class dom-tag-element 1398. The dom-tag-element 1398 represents a markup element. The dom-tag-element 1398 has a base class dom-element 1388. As a specialization of the dom-element 1388, the dom-tag-element 1398 implements the client interface for the client-element 1024.

A textual member name 1458 is provided by the dom-tag-element 1398. The name 1458 represents the tag name.

A member attribute-sequence 1436 is provided by the dom-tag-element 1398. The attribute-sequence 1436 is a sequence of dom-attribute 1386. The attribute-sequence 1436 represents the attributes, if any, in the start tag of a markup element.

A member children 1434 is provided by the dom-tag-element 1398. The children 1434 is a sequence of dom-element 1388. The children 1434 represents the body constituents, if any, in a markup elememt.

A constructor 1460 is provided by the dom-tag-element 1398. The constructor 1460 receives a textual argument, which is used to initialize the name 1458.

A destructor 1462 is provided by the dom-tag-element 1398. The destructor 1462 deletes the elements of the children 1434.

A member function accept-attribute 1464 is provided by the dom-tag-element 1398. The accept-attribute 1464 specializes the accept-attribute 1408, which in turn implements the client request accept-attribute 1034. An instance of the dom-attribute 1386 is created, initialized with the arguments key 1466 and value 1468. The newly created dom-attribute 1386 is appended to the attribute-sequence 1436. Success is indicated with a return of true. In an alternate embodiment, the member function could verify the uniqueness of the key, enforcing XML requirements.

A member function configure 1470 is provided by the dom-tag-element 1398. The configure 1470 specializes the configure 1410, which in turn implements the client request configure 1036. The configure 1470 simply returns true, since there are no required attributes for the dom-tag-element 1398.

A member function accept-element 1472 is provided by the dom-tag-element 1398. The accept-element 1472 specializes the accept-element 1412, which in turn implements the client request accept-element 1038. The supplied element 1474 is accumulated to the children 1434. Success is indicated with a return of true.

A member function accept-text 1476 is provided by the dom-tag-element 1398. The accept-text 1476 specializes the accept-text 1414, which in turn implements the client request accept-text 1040. An instance of the dom-text-element 1396 is created using the constructor 1442 initialized with the supplied text 1478. The newly created dom-text-element 1396 is accumulated to the children 1434. Success is indicated with a return of true.

A member function commit 1480 is provided by the dom-tag-element 1398. The commit 1480 specializes the commit 1418, which in turn implements the client request commit 1042. The commit 1480 simply returns true, since there are no required constituent elements for the dom-tag-element 1398.

A member function tag-element 1482 is provided by the dom-tag-element 1398. The tag-element 1482 specializes the safe downcast tag-element 1422. The tag-element 1482 successfully returns the responsive dom-tag-element 1398.

A member function dispatch-view 1484 is provided by the dom-tag-element 1398. The dis-patch-view 1484 specializes the dispatch-view 1424. The dispatch-view 1484 receives an argument of dom-viewer 1392. The view-tag 1432 is requested of the supplied dom-viewer 1392 with argument the responsive dom-tag-element 1398. The dispatch-view 1484 returns a boolean value indicating the success of the view-tag 1432.

9.6 Document-Object Model

FIG. 21 depicts an exemplary embodiment of the class dom-model 1390. The dom-model 1390 encapsulates the application-specific data structure to which markup may be read or written and subsequently processed. The dom-model 1390 represents a single document, in keeping with XML requirements. In alternate embodiment, one or more documents could be represented. The class dom-model 1390 implements the client-model 1022 from the interface 1004.

A member root 1486 is provided by the dom-model 1390. The root 1486 is an instance of the dom-tag-element 1398. The root 1486 represents a root markup element. In keeping with the XML requirement that a document may only contain a single root markup element, the root 1486 is a singleton. The singleton root 1486 could be replaced by a collection in an alternative embodiment that was more relaxed about XML compatibility.

A constructor 1488 is provided by the dom-model 1390. The constructor 1488 initializes the root 1486 to null, indicating that no markup has yet been processed.

A destructor 1490 is provided by the dom-model 1390. The destructor 1490 deletes the root 1486.

A member function construct-element 1492 is provided by the dom-model 1390. The construct-element 1492 implements the client request construct-element 1028. The construct-element 1492 is supplied with an argument name 1494, of text 1026, representing the name of a markup element, the start tag of which has been detected in processing markup. The construct-element 1492 returns an instance of the dom-element 1388. An instance of the dom-tag-element 1398 is constructed via an invocation of the constructor 1460 with the name 1494. The newly constructed dom-tag-element 1398 is returned.

A member function accept-element 1496 is provided by the dom-model 1390. The accept-element 1496 implements the client request accept-root-element 1030. The accept-element 1496 is supplied with an argument, an instance of the dom-element 1388, representing a root markup element which has been detected in the markup. Failure is returned if the root 1486 is nonzero; a nonzero root 1486 indicates a previously detected root tagged sequence, which has been deemed invalid in this exemplary embodiment (for consistency with XML, which permits at most one root markup element per document). Otherwise, an attempt is made to safely downcast the element 1498 to an instance of the dom-tag-element 1398, using the tag-element 1422. The root 1486 is assigned from the result of the downcast, which succeeds in case the supplied element 1498 may be specialized to a dom-tag-element 1398. The success or failure of the accept-element 1496 is returned according to whether the root 1486 is nonzero.

A member function accept-text 1500 is provided by the dom-model 1390. The accept-text 1500 implements the client request accept-root-text 1032. The accept-text 1500 is supplied with a textual argument, representing root textual content. The accept-text 1500 returns true, ignoring the supplied text.

9.7 Document-Object XML Writer

FIG. 22 depicts an exemplary embodiment of a dom-xml-writer 1400. The dom-xml-writer 1400 operates on a a dom-model 1390 to produce XML markup. The dom-xml-writer 1400 is derived from the dom-viewer 1392.

A member sink 1502 is provided by the dom-xml-writer 1400. The sink is a recipient for textual data; it abstracts details of a file, stream, pipe, string, or other target for textual data.

A constructor 1504 is provided by the dom-xml-writer 1400. The constructor 1504 receives a first argument of dom-model 1390, representing the XML markup to be produced. The constructor 1504 receives a sink second argument, representing the target for the textual data. The constructor 1504 initializes the sink 1502. The constructor 1504 dispatches a view to the root 1486 of the supplied instance of the dom-model 1390.

A member function xml-encode 1506 is provided by the dom-xml-writer 1400. The xml-encode 1506 is responsible for encoding any characters in textual data which have a syntactic meaning in XML. Such characters include angle brackets, the ampersand, and quote characters. The xml-encode 1506 receives an argument of text 1026, representing text to be written. The supplied text is written to the sink 1502, with any special characters appropriately encoded.

A first member function view 1508 is provided by the dom-xml-writer 1400. The view 1508 is responsible for producing textual data from a dom-text-element 1396. The view 1508 specializes view-text 1438. The view 1508 receives an argument of dom-text-element 1396. The view 1508 returns a boolean value, indicating the production of the textual data. The xml-encode 1506 is invoked for the supplied text. True is returned to indicate success.

A second member function view 1510 is provided by the dom-xml-writer 1400. The view 1510 is responsible for producing a markup element from a dom-tag-element 1398. The view 1510 specializes view-tag 1432. The view 1510 receives an argument of dom-tag-element 1398, representing the markup element. The view 1510 returns a boolean value, indicating the success of the markup element.

FIG. 23 depicts an exemplary embodiment of the second view 1510, drawn from dom-xml-writer 1400. The view 1510 receives an instance of the dom-tag-element 1398, representing the markup element to be written. A boolean indicating failure is initialized to false. The XML open angle bracket and name 1458 of the supplied markup element are written to the sink 1502. A loop is performed over the attribute-sequence 1436. For each attribute, the attribute key and value are written. A closing angle bracket is written to conclude the start tag of the markup element. A loop is performed over the children 1434. The dispatch-view 1424 is requested of each child. If the dispatch-view 1424 fails, failure is noted and the loop is broken. The end of the markup element is written. Success is indicated by inversion of the failed-here 1512.

10 Document-Object Writer Application

FIG. 24 depicts an exemplary embodiment of an dom-xml 1514. The dom-xml 1514 serves to read supplied markup compliant to the metalanguage disclosed herein, and to provide XML markup, preserving the structure and content of the supplied markup in the provided XML markup. The dom-xml 1514 is a command-line application which follows the usual C/C++conventions for such an application.

In the dom-xml 1514, a model 1516 is defined. The model 1516 is an instance of the dom-model 1390. The model 1516 represents markup.

A driver 1518 is defined as an instance of the client-driver 1272, parameterized by the dom-model 1390 and the dom-element 1388. The driver 1518 is provided with the model 1516 in the constructor 1358. The driver 1518 processes markup to generate client requests to the provided instance of the dom-model 1390.

The parse 1274 is requested of the driver 1518, with argument stdin, a file handle providing access to the standard input of a command-line application. If the parse 1274 fails, the dom-xml 1514 returns a non-zero numerical code indicating parse failure.

A local sink 1520 is provided in the dom-xml 1514. The sink receives textual data and directs it to the supplied file handle. Here, the supplied file is stdout, which writes to the standard output of a command-line application.

A local writer 1522 is provided in the dom-xml 1514. The writer 1522 is a dom-xml-writer 1400. The writer 1522 is supplied with arguments model 1516 and sink 1520 in the invocation of the constructor 1504. All of the processing of the writer 1522 is carried out in the constructor 1504. The application indicates success, returning zero (in accordance with the usual command-line convention).

FIG. 25 depicts the XML document which is written by operation of the application dom-xml 1514 upon the previously depicted document using the markup language in accordance with an embodiment of the present invention.

I claim:

1. A computer-implemented method for processing markup, comprising the steps of:
   - detecting an instance of textual content;
   - detecting a markup element including an open character, a textual name, an optional predicate segment, an optional body, and a close character;
   - detecting said optional predicate segment, including one or more predicates separated by a predicate-separator character, each of said predicates including a textual relation and optional textual complements separated by a complements-separator character; and
   - detecting said optional body, including a body separator character and an optional sequence of instances of textual content and nested markup elements;
   - dispatching model notifications to a model object, said model notifications including model-construct-element, model-accept-root-element, and model-accept-root-text; and
   - dispatching element notifications to a plurality of element objects, said element notifications including accept-attribute, configure, accept-element, accept-text, and commit;
   - contructing an element, one of said element objects;
   - accepting an element, one of said element objects, by said model object;
   - accepting an attribute by one of said element objects;
   - accepting an instance of textual content by one of said element objects; and
   - accepting a nested element, one of said element objects, by one of said element objects;
   - processing said model object and said element objects to produce XML markup.

2. A computer-implemented driver residing in the memory of a computer configured to process markup to generate object-oriented operations on a model object and a plurality of element objects, said model object configured to respond to model notifications including model-construct-element, model-accept-root-element, and model-accept-root-text, and each of said element objects configured to respond to element notifications including accept-attribute, configure, accept-element, accept-text, and commit, comprising:
   - a lexical analyzer configured to detect a plurality of terminal tokens, each of said terminal tokens associated with one or more characters from said markup, and further configured to dispatch lexical notifications, said lexical notifications including name, white, black, quote-open, quote-accumulate, and quote-close;
   - a syntax analyzer configured to detect a plurality of rules, and further configured to dispatch syntactic notifications, said syntactic notifications including accept-leaf, accept-node, configure-node, commit-node, configure-commit-node, node-accept-leaf, node-accept-node, node-accept-predicate, predicate, predicate-object, and predicate-plural-object; and
   - a parse responder configured to respond to said lexical notifications and said syntactic notifications, and further configured to dispatch said model notifications to said model object and to dispatch said element notifications to said element objects.

* * * * *